United States Patent
Wittliff, III

(10) Patent No.: US 9,643,638 B1
(45) Date of Patent: May 9, 2017

(54) MOTORIZED SERVICE CART

(71) Applicant: Bosch Automotive Service Solutions, Inc., Warren, MI (US)

(72) Inventor: William W. Wittliff, III, Gobles, MI (US)

(73) Assignees: Bosch Automotive Service Solutions Inc., Warren, MI (US); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/971,407

(22) Filed: Dec. 16, 2015

(51) Int. Cl.
| | |
|---|---|
| G05D 1/00 | (2006.01) |
| G05B 19/18 | (2006.01) |
| B62B 5/00 | (2006.01) |
| G01P 15/18 | (2013.01) |

(52) U.S. Cl.
CPC .......... *B62B 5/0076* (2013.01); *B62B 5/0033* (2013.01); *G01P 15/18* (2013.01); *G05D 1/0011* (2013.01); *G05D 1/0016* (2013.01)

(58) Field of Classification Search
USPC .............................................. 701/2; 700/250
See application file for complete search history.

(56) References Cited

U.S. PATENT DOCUMENTS

| | | | |
|---|---|---|---|
| 5,314,037 A | 5/1994 | Shaw et al. | |
| 5,418,354 A * | 5/1995 | Halling | G06K 7/10881 186/28 |
| 6,496,107 B1 | 12/2002 | Himmelstein | |
| 6,864,829 B2 | 3/2005 | Bervoets et al. | |
| 7,636,645 B1 * | 12/2009 | Yen | A63F 13/02 702/150 |
| 8,210,548 B1 * | 7/2012 | Agyemang | A61B 50/13 280/47.35 |
| 8,346,391 B1 * | 1/2013 | Anhalt | B25J 9/163 700/245 |
| 8,700,306 B2 | 4/2014 | Duggan et al. | |
| 2004/0179332 A1 * | 9/2004 | Smith | A61B 90/36 361/679.41 |
| 2005/0187819 A1 * | 8/2005 | Johnson | B62B 3/1424 705/14.42 |
| 2007/0208631 A1 * | 9/2007 | Jung | G06Q 30/0601 705/27.1 |

(Continued)

OTHER PUBLICATIONS

Wikipedia, Collision Avoidance System, Last modified Nov. 20, 2015. https://en.wikipedia.org/wiki/Collision_avoidance_system.

(Continued)

*Primary Examiner* — Tyler Paige
(74) *Attorney, Agent, or Firm* — Baker Hostetler LLP

(57) ABSTRACT

The disclosure describes a remotely controllable service cart system, and methods of operating the same. Such systems and methods may include a remotely controllable service cart, a microcontroller located on the service cart, a transmitter configured to transmit a command from a user, a receiver located on the service cart for receiving the transmitted command, the microcontroller configured to produce a control signal from the transmitted command, and a drive system located on the service cart and operatively connected to the microcontroller, the drive system configured to move the service cart in response to the control signal.

20 Claims, 7 Drawing Sheets

(56) References Cited

U.S. PATENT DOCUMENTS

| | | | | |
|---|---|---|---|---|
| 2007/0297320 A1* | 12/2007 | Brummette | .............. | F42D 5/04 |
| | | | | 370/208 |
| 2008/0041644 A1* | 2/2008 | Tudek | ....................... | B60L 7/12 |
| | | | | 180/65.1 |
| 2008/0262669 A1* | 10/2008 | Smid | .................... | G05D 1/0212 |
| | | | | 701/23 |
| 2012/0180424 A1* | 7/2012 | Hinshaw | ................... | E04B 1/26 |
| | | | | 52/745.02 |
| 2014/0244084 A1* | 8/2014 | Raftry | ................... | B60W 10/02 |
| | | | | 701/22 |
| 2014/0266024 A1 | 9/2014 | Chinnadurai et al. | | |
| 2015/0032258 A1* | 1/2015 | Passot | ................... | B25J 9/1656 |
| | | | | 700/250 |
| 2015/0206121 A1* | 7/2015 | Joseph | ................ | G06Q 20/208 |
| | | | | 705/23 |
| 2015/0306761 A1* | 10/2015 | O'Connor | .............. | G06N 3/008 |
| | | | | 700/250 |
| 2016/0059120 A1* | 3/2016 | Komorous-King | ... | A63F 13/211 |
| | | | | 463/36 |
| 2016/0059875 A1* | 3/2016 | Segman | ............... | B62B 5/0063 |
| | | | | 701/24 |

OTHER PUBLICATIONS

Wikipedia, Transponder, Last modified Dec. 1, 2015. https://en.wikipedia.org/wiki/Transponder.

\* cited by examiner

MOTORIZED SERVICE CART

TECHNICAL FIELD

This disclosure relates generally to motorized service carts, tool boxes, or workstations, and more particularly to a remotely controllable moveable service cart, tool box, workstation, or the like.

BACKGROUND

Current moveable service carts, tool boxes, and workstations are large in stature and difficult to move around in a shop or service station environment. Such a shop or service station environment can be crowded with tools, parts, technicians, automobiles as well as other objects to be repaired or serviced. A technician desiring to bring his or her service cart, tool box, workstation, or other similar object to another location in the shop or service station area typically must push or pull the desired object with them when moving to another location in the shop or service station area.

The service cart, tool box, workstation, or other similar object may have wheels located on the bottom to enable the technician to roll the object with them, but such a relocation process can still be difficult given the size, weight, and shape of the object being moved, and/or the strength of the technician. Presently, the alternative is to simply leave the service cart, tool box, workstation, or other similar object stationary and have the technician make multiple trips back and forth from the service cart to the desired location of the technicians work when a new tool is needed for example. This process can be very inefficient, resulting in increased time to complete a task and thus increased labor costs.

This leaves a technician with a dilemma to either move his or her service cart, tool box, workstation, or other similar object manually by pushing, pulling, or otherwise dragging the object to his or her job location, or leaving the object in place while making repeated trips back and forth to retrieve the tools he or she may need to do the job.

Accordingly, there is a need for improved service cart, tool box, workstation, or other similar object that would allow a technician to move his or her entire service cart, tool box, workstation, or other similar object at his disposal without having to physically maneuver the object by pushing, pulling, or otherwise dragging the object through the shop to get the object to the job location. Various aspects of the disclosure may solve one or more of these problems and/or disadvantages.

SUMMARY

In one aspect, the disclosure describes a remotely controllable service cart system, including a remotely controllable service cart, a microcontroller located on the service cart, a receiver located on the service cart for receiving a transmitted command from a user, the microcontroller configured to produce a control signal from the transmitted command, and a drive system located on the service cart and operatively connected to the microcontroller, the drive system configured to move the service cart in response to the control signal.

In another aspect, the disclosure describes a method of remotely controlling a service cart, the method including receiving a voice command from a user at a receiver located on a service cart, producing a control signal by a microcontroller from the received voice command, and moving a drive system of the service cart in response to the control signal.

In yet another aspect, the disclosure describes a remotely controllable service cart, including a microcontroller located on the service cart, a receiver located on the service cart for receiving a transmitted command from a user, a memory containing previously stored command recognition information, the microcontroller comparing the received command with the stored command recognition information to produce a control signal, and a drive system located on the service cart and operatively connected to the microcontroller, the drive system configured to move the service cart in response to the control signal.

Further and alternative aspects and features of the disclosed principles will be appreciated from the following detailed description and the accompanying drawings. As will be appreciated, the systems and methods disclosed herein are capable of being carried out in other and different aspects, and capable of being modified in various respects. Accordingly, it is to be understood that both the foregoing general description and the following detailed description are exemplary and explanatory only and do not restrict the scope of the appended claims.

DETAILED DESCRIPTION

Figure 1:
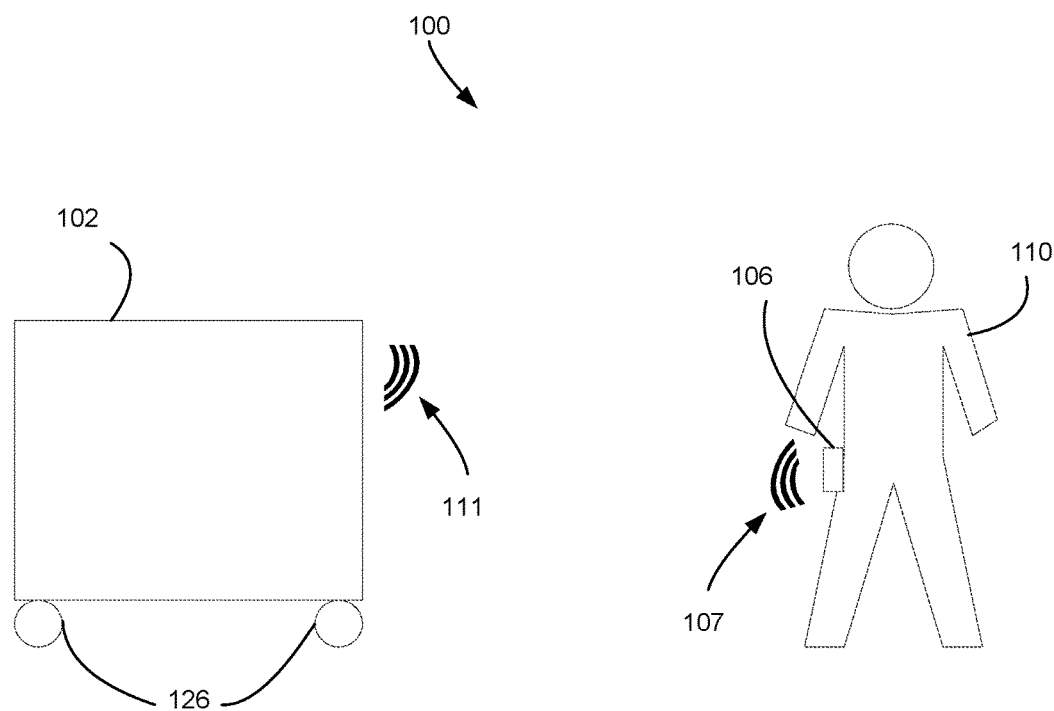
FIG. 1 illustrates a remotely controllable service cart system according to an aspect of the disclosure.

Now referring to the drawings, wherein like reference numbers refer to like elements, remotely controllable service cart systems and methods of operating the same are illustrated. Any numerical values recited herein are by way of illustration only. In other aspects, other values may be used, and the values can be varied in any fashion as appropriate to the application.

An exemplary aspect of the disclosure provides a remotely controllable service cart system with a microcontroller located on a service cart, a transmitter configured to transmit a command signal from a user, a receiver located on the service cart for receiving the transmitted command, where the microcontroller is configured to produce a control signal from the transmitted command signal, and a drive system located on the service cart and operatively connected to the microcontroller, the drive system configured to move the service cart in response to the control signal.

The remotely controllable service cart can be a service cart such as a tool box, quick service cart, or other moveable workstation that can be configured to follow a technician or operator around a workshop or service station. The technician can have a transponder or other type of transmitter that emits an encoded signal over any suitable frequency (e.g., Bluetooth, Wi-Fi, etc.). The transponder may have a microphone and speaker for communication with the workstation controller, where the workstation can respond to voice commands (e.g., "follow", "stop", "come", "stay", etc.) that are transmitted to the workstation controller via the transponder. In certain aspects, the transponder may be located on the service cart, and in other aspects the transponder may be located separately from the service cart. The workstation can have a propulsion system to allow it to move on its own without a technician having to physically push or pull the workstation. In an aspect, the workstation may have a feedback mechanism to the transponder to communicate to the user or technician if a problem is present with the command given to the workstation. Such feedback mechanisms may include an accelerometer, such as a 6-axis accelerometer, to prevent tipping, and a camera or series of camera to ensure that the workstation does not run into or over any other objects in the area.

Figure 2:
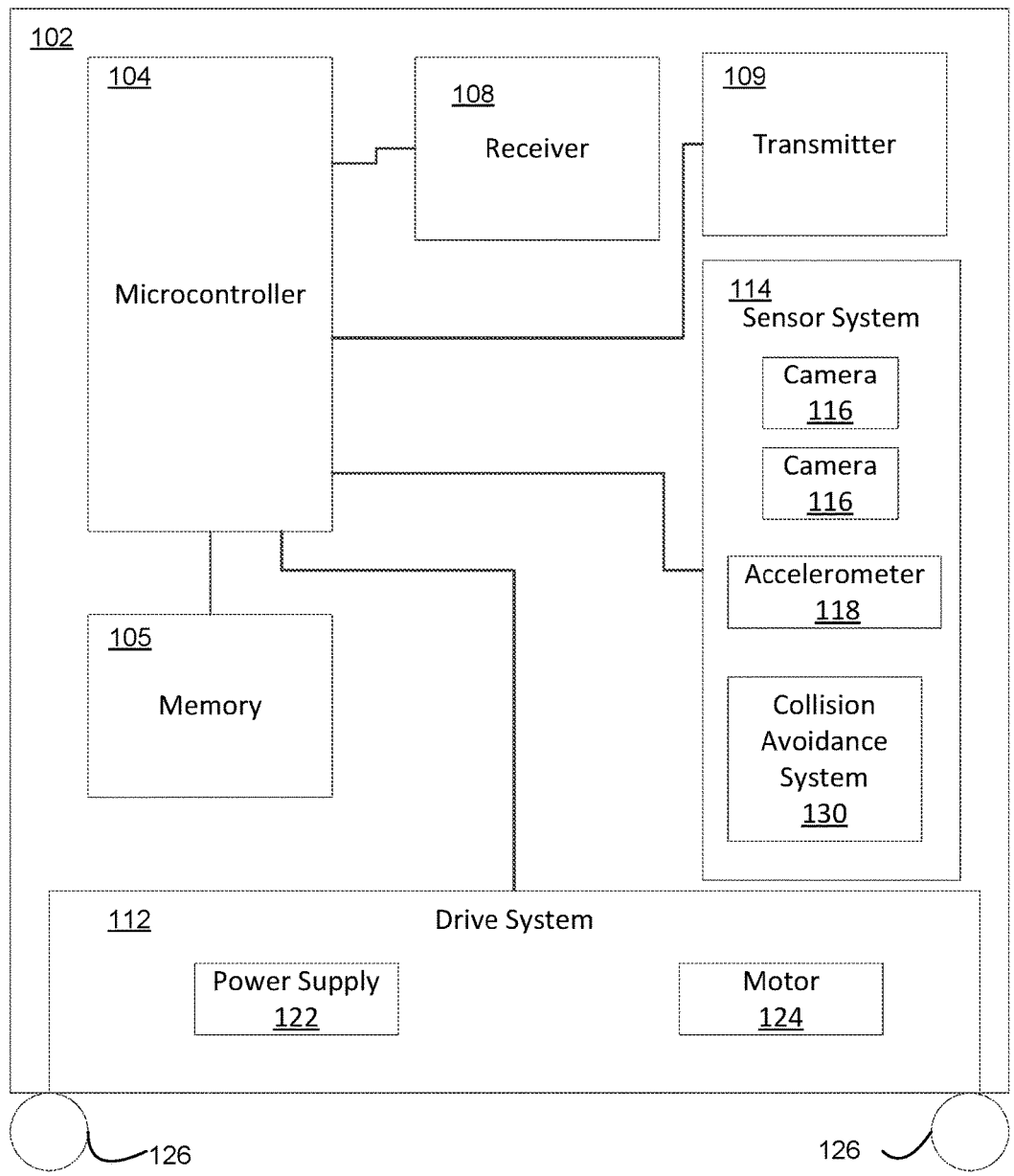
FIG. 2 illustrates a block diagram of a remotely controllable service cart according to an aspect of the disclosure.
Figure 3:
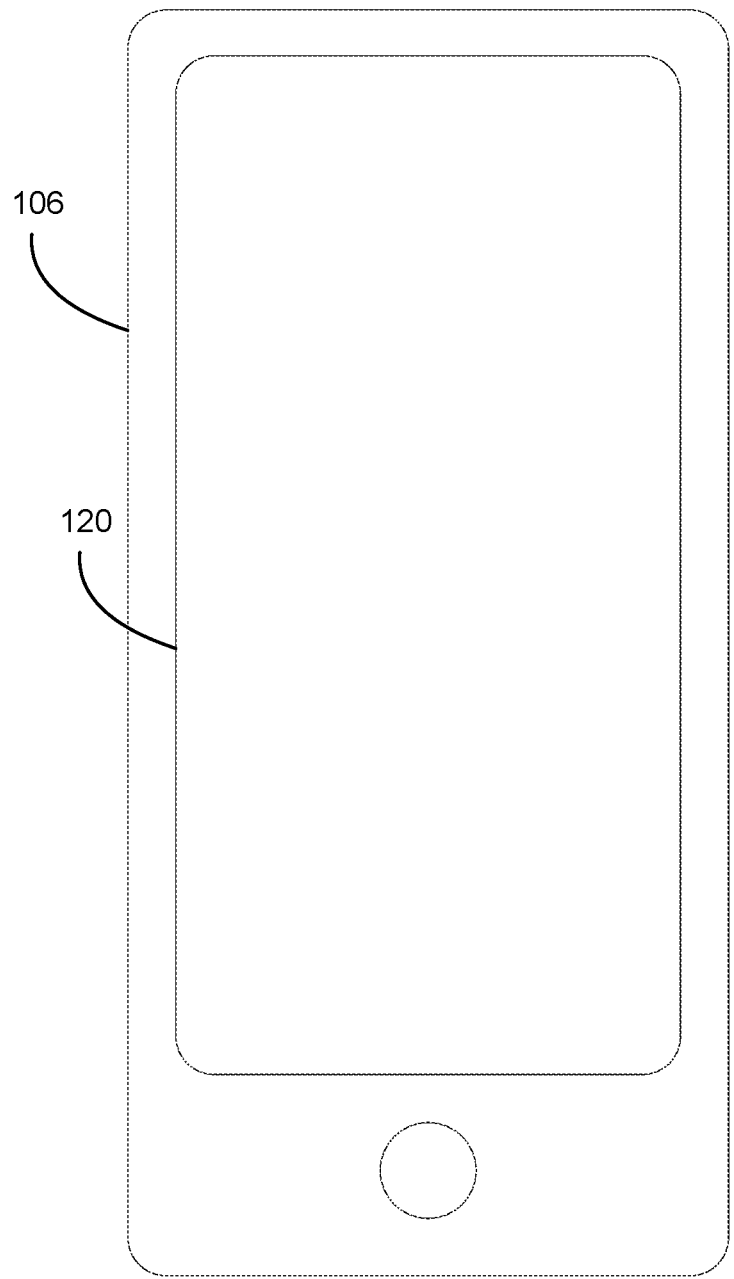
FIG. 3 illustrates a transmitter according to an aspect of the disclosure, where the transmitter is a mobile phone.

Referring to FIG. 1 to FIG. 3, as seen in FIG. 1, a remotely controllable service cart system 100 is illustrated, the system including a remotely controllable service cart 102, and a transmitter 106 configured to transmit a command signal 107 from a user 110. The user 110, may be a technician, mechanic, or other operator of the service cart 102. In certain aspects, the user 110 and the remotely controllable service cart system 100 may be located in a shop or service station environment such as an automotive repair garage or other similar environment where a user 110 may need to move a heavy or bulky object around along with them to accomplish a task, such as the repair of a vehicle.

In an aspect as seen for example in FIG. 2, the remotely controllable service cart 102 may include a microcontroller 104 located on the service cart 102, where the microcontroller 104 can be configured to produce a control signal from the transmitted command signal 107. A receiver 108 may be located on the service cart 102 for receiving the transmitted command. In some aspects, a drive system 112 can be located on the service cart 102 and be operatively connected to the microcontroller 104, where the drive system 112 can be configured to move the service cart 102 in response to the control signal.

The remotely controllable service cart 102 may further include a sensor system 114 operatively connected to the microcontroller 104, where the sensor system 114 may be configured to control the remotely controllable service cart 102. The sensor system 114 can include a number of cameras 116 located on the remotely controllable service cart 102. In some aspects, the system 100 can include cameras or other sensors in other locations than on the service cart 102, as in separately located cameras mounted on a wall of a shop such as security cameras (not shown). Such separately located cameras can have a transmitter that transmits the video footage from the separately located cameras to the service cart 102.

In certain aspects, the sensor system 114 can further include an accelerometer 118 located on the remotely controllable service cart 102. The accelerometer 118 can be used to measure the acceleration or deceleration and help in determining the orientation of the service cart 102. Any number of accelerometers 118 may be used by the service cart 102. In some aspects, the accelerometer 118 may be a 3-axis, and in other aspects a 6-axis accelerometer can be used.

The transmitter 106 can be configured to transmit a voice command or other signal from the user 110 to the receiver 108, and the receiver 108 can be configured to receive the voice command or other signal from the transmitter 106. A transmitter 109 can be located on the service cart 102. In certain aspects, the transmitter 109 can transmit a return signal 111 including data such as feedback information from the sensor system 114 or drive system 112 to the user 110. In some aspects, the transmitter 109 may be the transmitter 106, such that the transmitter 109 can be configured to transmit a voice command or other signal from the user 110 to the receiver 108. In other aspects, the transmitter 106 may be located separately from the service cart 102, such that a user 110 can perform their job around the shop area without having to physically push, pull, or otherwise drag the service cart 102 around the shop area with them. In some aspects, the transmitter 106 may be located on the remotely controllable service cart 102, while in other aspects the transmitter 106 may be located separately or away from the remotely controllable service cart 102. The transmitter 106 can be any device capable of transmitting a desired signal to the service cart 102 to enable the user 110 to control the service cart 102. For example, the transmitter 106 and transmitter 109 can be a transponder, transceiver, mobile phone, or any device capable of transmitting a signal to the service cart 102. The transmitter 106 and transmitter 109 may send, and the receiver 108 may receive, signals over any suitable frequency such as Bluetooth (e.g. 2.4 GHz to 2.485 GHz), Wi-Fi (e.g. 2.4 GHz or 5 GHz), as well as others. In certain aspects, the transmitter 109 and the receiver 108 may be the same device, such as a transceiver. In some aspects, the receiver 108 can be configured to receive the voice command directly from the user 110 without an intermediate transmitter 106 or transmitter 109.

In aspects where the transmitter 106 is a mobile phone (FIG. 3), the mobile phone may include features typical of a mobile phone such as a transmitter and a receiver, and have a touchscreen display 120, such that a video from the cameras can be configured to be viewed on the touchscreen display 120 by a user 110. In certain aspects, the user 110 can control the service cart 102 by touching the touchscreen display 120 to direct, drive, or otherwise control the motion of the service cart 102. For example, touching the left side of the touchscreen display 120 from the perspective of the user 110 can indicate to the service cart 102 to turn left, while touching the right side of the touchscreen display 120 from the perspective of the user 110 can indicate to the service cart 102 to turn right. In other aspects, swiping the touchscreen display 120 in a right to left motion by the user 110 can indicate to the service cart 102 to turn left, while swiping in a left to right motion can indicate to the service cart 102 to turn right. In such examples, the mobile phone transmits the touching or swiping motion by the transmitter on the mobile phone through a signal 107 to the service cart 102, where the signal 107 is received by the receiver 108 on the service cart 102, where the signal 107 is sent to the microcontroller 104 for processing. The microcontroller 104 then interprets the received signal 107, such as by comparing the received signal 107 to a library commands a memory 105. In the aspect shown in FIG. 2, the memory 105 is located separately from the microcontroller 104, but in other aspects the memory 105 may be part of the microcontroller 104. The memory 105 may contain previously stored command recognition information, where the microcontroller 104 compares the received signal 107 with the stored command recognition information to produce a control signal to move or drive the service cart 102 by sending the control signal to the drive system 112. The microcontroller 104 can then direct the drive system 112 to move the service cart 102 as commanded by the user 110. In certain aspects, the drive system 112 may be located on the service cart and operatively connected to the microcontroller 104, where the drive system 112 can be configured to move the service cart 102 in response to the control signal from the microcontroller 104.

The drive system 112 can include a power supply 122, a motor 124 operatively connected to the power supply 122, and a plurality of wheels 126 operatively connected to the motor 124. The power supply 122 can be anything sufficient to power the motor 124, such as a battery or other energy storage device. For example, the power supply 122 may be at least one of a wet cell battery, a dry cell battery, a molten salt battery and a reserve battery. The motor 124 can be any motor, engine, or other similar device capable of converting stored energy into mechanical energy to move the components of the drive system 112 to propel the service cart 102.

In certain aspects, the service cart 102 can further include a collision avoidance system 130. A collision avoidance system 130 can be a collision warning system or a collision mitigating system that can use sensors such as radar, lasers, cameras, or any combination of such sensors to detect or avoid an imminent collision between the service cart 102 and another object or person. In an aspect, the cameras 116 can be radar or laser emitters and sensors. First, the collision avoidance system 130 may use the sensors to detect an impending collision between the service cart 102 and a foreign object (not shown). Once a detection has occurred, the collision avoidance system 130 can provide a warning to the user 110 that an imminent collision is about to occur, and the user 110 can direct the service cart 102 manually to avoid the collision, or the collision avoidance system 130 can take action autonomously without any user input. The collision avoidance system 130 can then send commands to the microcontroller 104 to avoid the collision, such as by braking, steering, or both.

The remotely controllable service cart 102 can further include a feedback notification system where signal is sent back to the transmitter 106 to alert the user of conditions such as an imminent collision to be avoided, or if an error is detected such as the service cart 102 being stuck on or against an object in the path of the service cart 102. The remotely controllable service cart 102 can be any service cart, workstation, or other similar device such as a tool box, an electrical charging system, a refrigerant recovery unit, a vehicle diagnostic tool, or the like.

Figure 4:
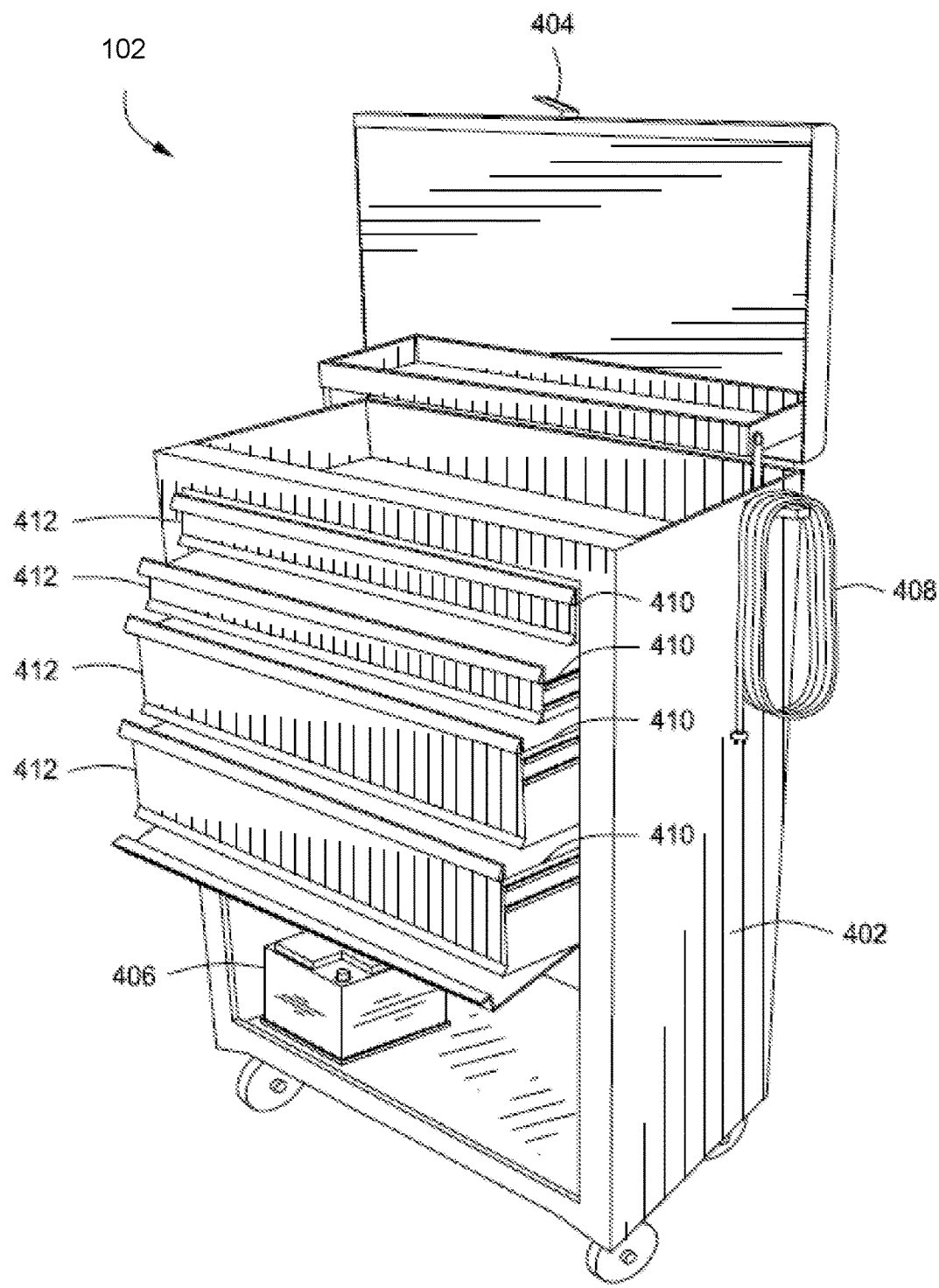
FIG. 4 illustrates a perspective view of a remotely controllable service cart according to an aspect of the disclosure where the remotely controllable service cart is a tool box.

Now referring to FIG. 4, an aspect is shown where the service cart 102 may be a tool box. In certain aspects, the service cart 102 may include features of the tool box of United States Patent Publication No. 2014/0266024, titled "Method and System for Wirelessly Charge a Diagnostic Tool," the disclosure of which is herein incorporated by reference. The service cart 102 may include a box housing 402 for storing tools, parts, and other objects. The box housing 402 may include a locking device 404 for securely locking the tools within the box housing 402. The service cart 102 may include a plurality of compartments 412 for storing the tools, parts, and other objects. The box housing 402 may internally include the components the service cart 102 of FIG. 2.

In a certain aspect, the box housing 402 may include a power source 406, a power cord 408 and a plurality of wireless chargers 410. Each of the plurality of wireless chargers 410 may be embedded into a large flat surface of each of the plurality of compartments 412 so that when a diagnostic tool (not shown) is placed inside the plurality of compartments 412 of the service cart 102, the diagnostic tool may be automatically charged. In another example, each of the plurality of wireless chargers may be integrated on any surface of each of the plurality of compartments 412 so that when the diagnostic tool is placed inside the plurality of compartments 412 of the service cart 102, the diagnostic tool may be automatically charged. In an exemplary aspect, the power source 406 may be at least one of a wet cell battery, a dry cell battery, a molten salt battery and a reserve battery.

Figure 5:
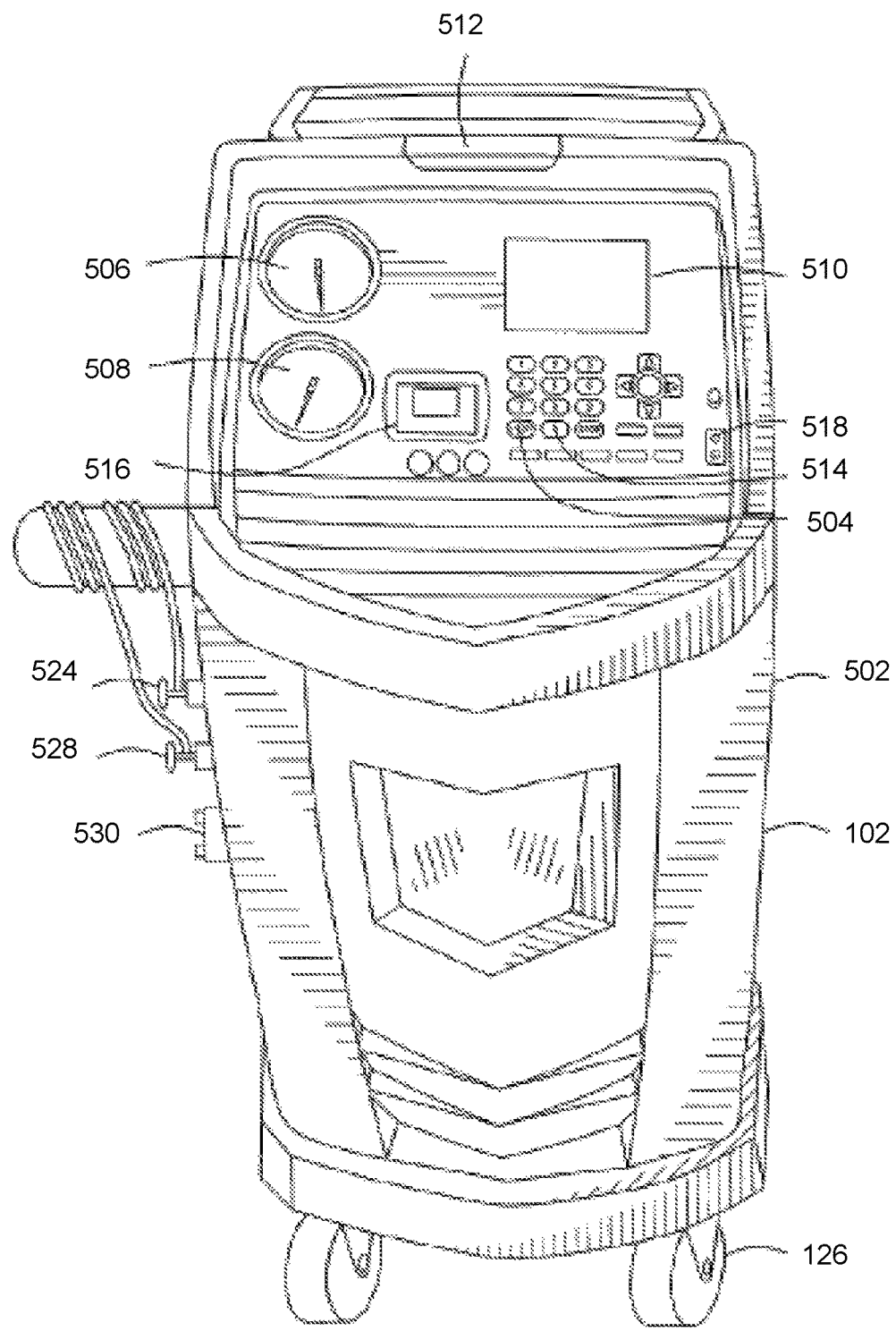
FIG. 5 illustrates a perspective view of a remotely controllable service cart according to another aspect of the disclosure where the remotely controllable service cart is a refrigerant recovery unit.

Now referring to FIG. 5, an aspect is shown where the service cart 102 may be a refrigerant recovery unit. The service cart 102 can be the AC1234™ from Robinair™ based in Owatonna, Minn. (Service Solutions U.S. LLC). The service cart 102 includes a cabinet 502 to house components of the system (See FIG. 2). In certain aspects, the service cart 102 may include features of the refrigerant recovery unit of United States Patent Publication No. 2013/0319025, titled "Refrigerant Recovery Unit with Diagnostic Interface," the disclosure of which is herein incorporated by reference.

The cabinet 502 includes a control panel 504 that allows the user to operate the service cart 102. The control panel 504 may be part of the cabinet 502 as shown in FIG. 5 or separated. The control panel 504 may include high and low gauges 506, 508, respectively. The gauges may be analog or digital as desired by the user. The control panel 504 has a display 510 to provide information to the user, such as certain operating status of the service cart 102 or provide messages or menus to the user. Located near the display 510 are LEDs 512 to indicate to the user the operational status of the service cart 102. The LEDs may indicate that the refrigerant recovery unit is in the recovery, recycling or recharging mode or indicate that the filter needs to be changed or that there is a malfunction. A user interface 514 is also included on the control panel 504. The user interface 514 allows the user to interact and operate the service cart 102 and can include an alphanumeric keypad and directional arrows. A printer 516 is provided to print out information, such as test results.

The cabinet 502 further includes connections for hoses 524, 528 that connect the service cart 102 to a refrigerant containing device, such as the vehicle's refrigerant system 500 (shown in FIG. 5). The cabinet 502 may be made of any suitable material such as thermoplastic, steel, and the like. Also shown in FIG. 5, a vehicle connector interface 530 is provided so that a communication cable can be connected from a vehicle connector interface to a data link connector in a vehicle (not shown). This allows the service cart 102 to communicate with the vehicle and diagnose any issues with it. In order for the service cart 102 to be mobile, wheels 126 are provided at a bottom portion of the system.

Figure 6:
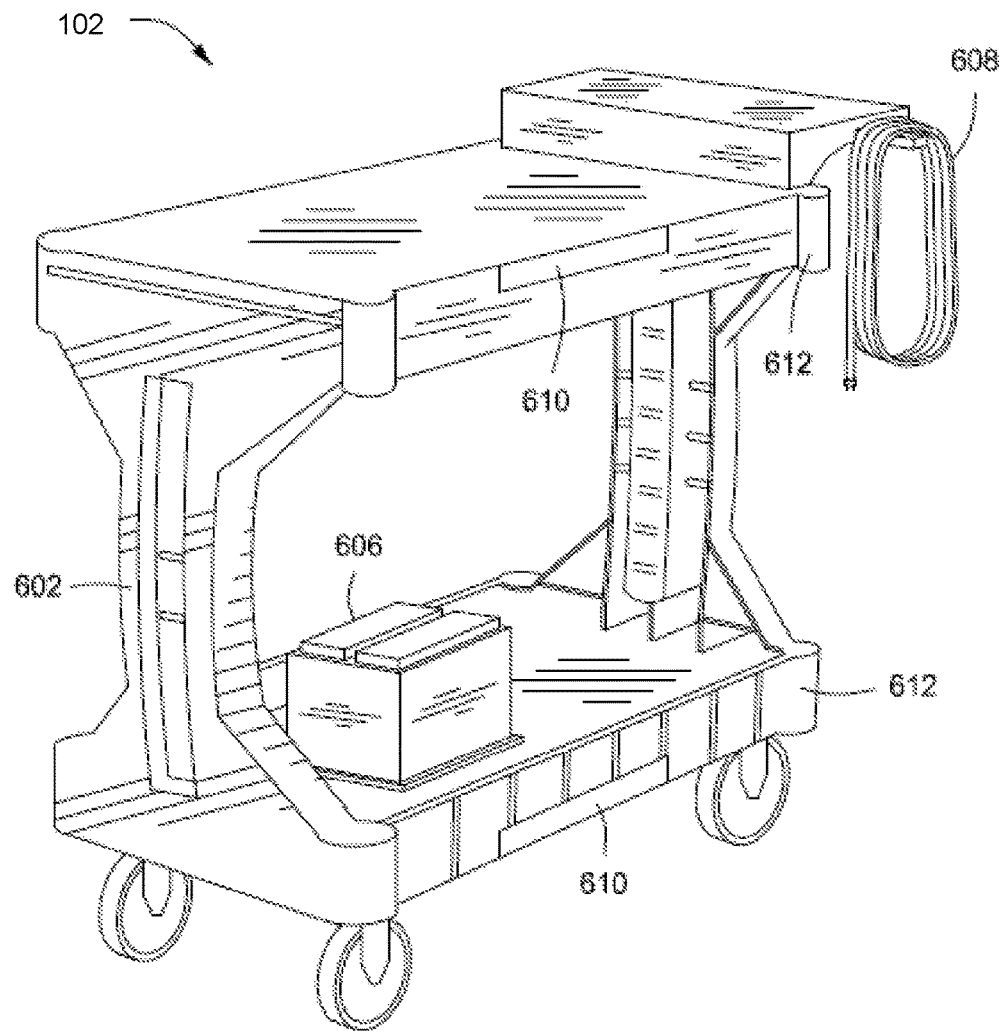
FIG. 6 illustrates a perspective view of a remotely controllable service cart according to an aspect of the disclosure where the remotely controllable service cart is a diagnostic tool cart.

Now referring to FIG. 6, an aspect is shown where the service cart 102 may be a diagnostic tool cart having a wireless charger according to an aspect of the disclosure. In certain aspects, the service cart 102 may include features of the diagnostic tool cart of United States Patent Publication No. 2014/0266024, titled "Method and System for Wirelessly Charge a Diagnostic Tool," the disclosure of which is herein incorporated by reference. The service cart 102 may have a plurality of cart levels 612 separated by a support 602. The plurality of cart levels 612 may store one or more power tools or diagnostic tools. It may be appreciated by one of skilled in the art that additional cart levels 612 may be included in the service cart 102 in order to accommodate additional power tools or diagnostic tools. The service cart 102 may include a power source 606, a power cord 608 and a plurality of wireless chargers 610. Each of the plurality of wireless chargers 610 may be integrated into each of the plurality of cart levels 612 so that when the diagnostic tool is placed on the plurality of cart levels 612, the power tool or diagnostic tool may be automatically charged.

The power cord 608 may be coupled to an external power source (e.g., an electrical outlet) to supply power to the plurality of wireless chargers 610. In another exemplary aspect, the power cord 608 may supply an electrical power to the power source 606. The power source 606 may be a portable power source (e.g., battery) and supply power to the plurality of wireless chargers 610. The power source 606 may enable continuous charging of the diagnostic tool when the power cord 608 is not coupled to the external power source. The power source 606 may be placed on the cart level 612 to store electrical energy. For example, the power source 606 may be replaced with other power sources. In an exemplary aspect, the power source 606 may be at least one of a wet cell battery, a dry cell battery, a molten salt battery and a reserve battery.

Figure 7:
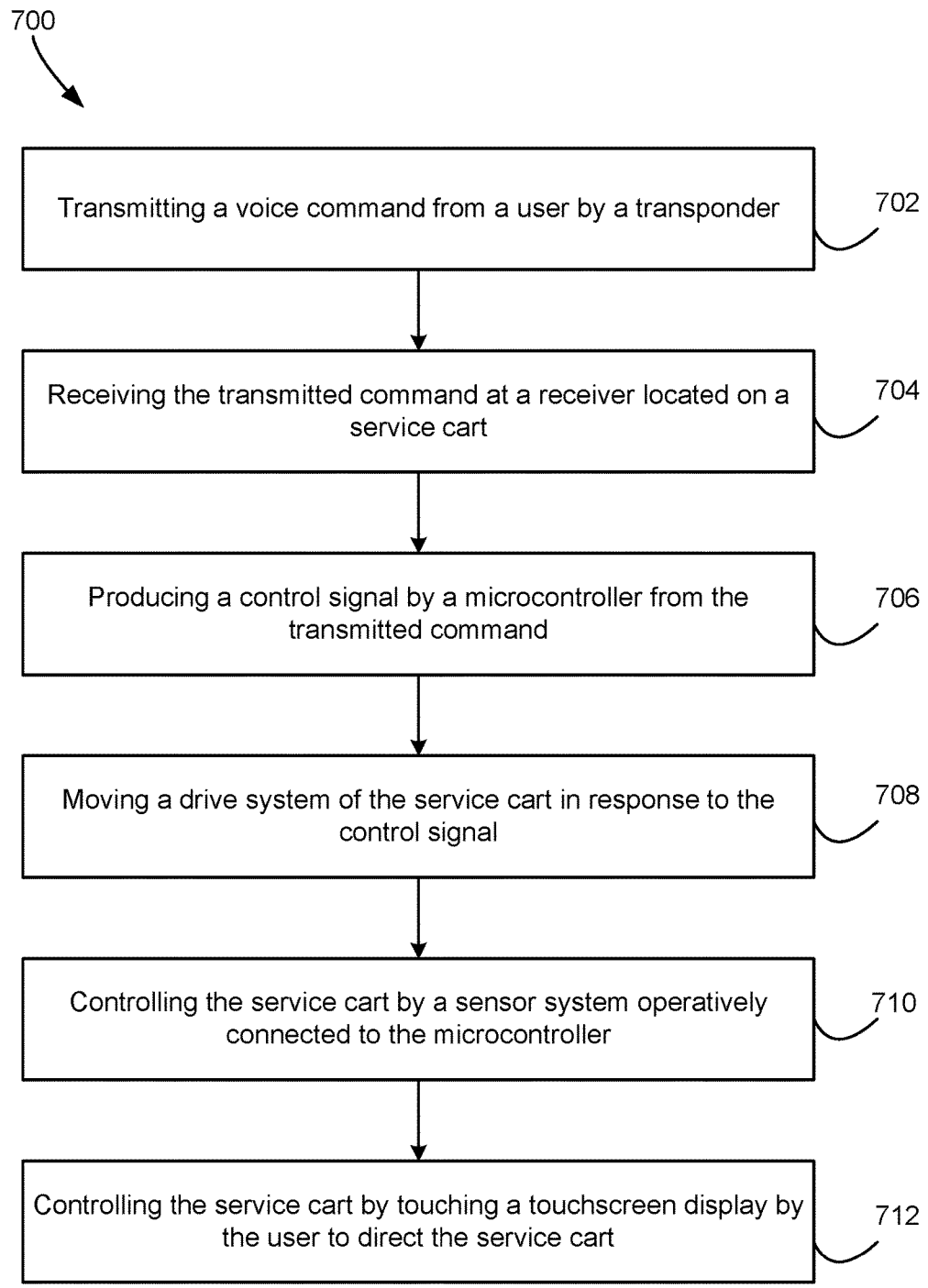
FIG. 7 illustrates a method of remotely controlling a service cart according to an aspect of the disclosure.

FIG. 7 illustrates a method 700 of remotely controlling a service cart 102 according to an aspect of the disclosure. The method 700 may include a step 702 where a voice command or other control signal is transmitted from a user 110 by a transponder. In step 704, the transmitted command may be received at a receiver 108 located on a service cart 102. A control signal may be produced by a microcontroller 104 based on the transmitted command in step 706. In step 708, the drive system 112 may be configured to move or drive the service cart 102 in response to the control signal produced by a microcontroller 104. The service cart 102 may be controlled in step 710 by a sensor system 114 operatively connected to the microcontroller 104. In certain aspects where the transmitter 106 is a mobile phone with a touchscreen display 120 the method 700 may include a step 712 of controlling the service cart 102 by touching a touchscreen display 120 by a user 110 to direct the service cart 102.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed is:

1. A remotely controllable service cart-system, comprising:
   a remotely controllable service cart configured to store tools that service a vehicle;
   a microcontroller located on the service cart;
   a first transmitter located on the service cart and configured to transmit a command from a user;
   a receiver located on the service cart for receiving the transmitted command from the user through the first transmitter;
   a sensor system operatively connected to the microcontroller, the sensor system configured to control the remotely controllable service cart and warn the user of an imminent collision, wherein the sensor system is further configured to automatically communicate with the microcontroller to avoid the collision;
   the microcontroller configured to produce a control signal from the transmitted command or the sensor system; and
   a drive system located on the service cart and operatively connected to the microcontroller, the drive system configured to move the service cart in response to the control signal.

2. The remotely controllable service cart system of claim 1, further comprising:
   a second transmitter configured to transmit a command from the user to the receiver.

3. The remotely controllable service cart system of claim 1, wherein the sensor system including a plurality of cameras located on the remotely controllable service cart and the remotely controllable service cart is further configured to alert the user that the remotely controllable service cart is stuck against an object in the cart's path.

4. The remotely controllable service cart system of claim 1, wherein the sensor system comprises an accelerometer located on the remotely controllable service cart.

5. The remotely controllable service cart system of claim 4, wherein the accelerometer is a 6-axis accelerometer.

6. The remotely controllable service cart system of claim 1, wherein the first transmitter transmits a voice command from the user, and the receiver receives the voice command.

7. The remotely controllable service cart system of claim 2, wherein the second transmitter is a transponder.

8. The remotely controllable service cart system of claim 1, wherein the first transmitter is a transponder.

9. The remotely controllable service cart system of claim 7, wherein the transponder is a mobile phone.

10. The remotely controllable service cart system of claim 9, wherein the mobile phone includes a touchscreen display, a video from a plurality of cameras being configured to be viewed on the touchscreen display, and wherein the user can control the service cart by touching the touchscreen display to direct the service cart.

11. The remotely controllable service cart system of claim 1, wherein the drive system further comprises:
   a power supply;
   a motor operatively connected to the power supply; and
   a plurality of wheels operatively connected to the motor.

12. The remotely controllable service cart system of claim 11, wherein the service cart further comprises a collision avoidance system.

13. The remotely controllable service cart system of claim 1, wherein the service cart further comprises a feedback system to the first transmitter to alert the user if an error is detected.

14. The remotely controllable service cart system of claim 13, wherein the service cart is one of a tool box, an electrical charging system, a refrigerant recovery unit, or a vehicle diagnostic tool.

15. A method of remotely controlling a service cart, the method comprising:
- sending a voice command from a user with a transmitter located on the service cart;
- receiving the voice command from the user at a receiver located on the service cart, the service cart configured to store tools that service a vehicle;
- sensing with a sensor system operatively connected to a microcontroller;
- if an imminent collision is detected by the sensor system; sending a warning to the user of the imminent collision and automatically communicating with the microcontroller to avoid collision;
- producing a control signal by the microcontroller from the received voice command; and
- moving a drive system of the service cart in response to the control signal.

16. The method of claim 15, further comprising the step of:
- transmitting the voice command from the user by a transponder.

17. The method of claim 16, further comprising the step of:
- controlling the service cart by the sensor system operatively connected to the microcontroller.

18. The method of claim 16, wherein the transponder is a mobile phone with a touchscreen display; and
- controlling the service cart by touching the touchscreen display by the user to direct the service cart.

19. A remotely controllable service cart, comprising:
- a microcontroller located on the service cart, the service cart configured to store tools that service a vehicle;
- a transmitter located on the service cart and configured to transmit a command from a user;
- a receiver located on the service cart for receiving the transmitted command from the user through the transmitter;
- a sensor system operatively connected to the microcontroller, the sensor system configured to control the remotely controllable service cart and warn the user of an imminent collision, wherein the sensor system is further configured to automatically communicate with the microcontroller to avoid the collision;
- a memory containing previously stored command recognition information, the microcontroller comparing the received command with the stored command recognition information to produce a control signal; and
- a drive system located on the service cart and operatively connected to the microcontroller, the drive system configured to move the service cart in response to the control signal.

20. The remotely controllable service cart of claim 19, wherein
- the sensor system configured to control the remotely controllable service cart, wherein the sensor system comprises a plurality of cameras and an accelerometer located on the remotely controllable service cart.

* * * * *